United States Patent
Meyer et al.

[15] 3,692,914
[45] Sept. 19, 1972

[54] 4,4',4''-TRIHYDROXYTRIPHENYL-METHYLMETHANE AS A LAXATIVE

[72] Inventors: Ronald J. Meyer; Orville E. Horsley; Herman J. Eichel, all of Cincinnati, Ohio

[73] Assignee: American Hoechst Corporation, New York, N.Y.

[22] Filed: June 22, 1970

[21] Appl. No.: 59,810

Related U.S. Application Data

[62] Division of Ser. No. 740,066, June 26, 1968, Pat. No. 3,579,542.

[52] U.S. Cl. ................................................424/346
[51] Int. Cl. .............................................A61k 27/00
[58] Field of Search.....................................424/346

[56]          References Cited
          UNITED STATES PATENTS 2,435,014   1/1948   Hiederl......................260/395
2,678,302   5/1954   Beaver et al...............252/107

*Primary Examiner*—Albert T. Meyers
*Assistant Examiner*—Frederick E. Waddell
*Attorney*—Curtis, Morris & Safford

[57]          ABSTRACT

4,4',4''-Trihydroxytriphenylmethylmethane having laxative (cathartic) properties of the formula:

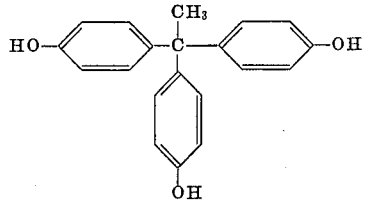

2 Claims, No Drawings

4,4',4''-TRIHYDROXYTRIPHENYLMETHYLMETHANE AS A LAXATIVE

This is a divisional application of application Ser. No. 740,066 filed June 26, 1968, now U.S. Pat. No. 3,579,542.

Compounds having laxative (cathartic) activity are known, for example, 3,3-bis(p-hydroxyphenyl)phthalide (Phenolphthalein), and 1,8-Dihydroxyanthraquinone (Danthron).

It has now been found that 4,4', 4''-trihydroxytriphenylmethylmethane is superior to the compounds named above with respect to its laxative (cathartic) properties and is active in smaller dosages.

It is the object of this invention to provide 4,4',4''-trihydroxytriphenylmethylmethane and a process for preparing it by condensing p-hydroxyacetophenone with phenol.

The reaction is carried out in the range of 0° to 100° C and preferably at 20° to 60° C in the presence of a catalyst. The reaction should be allowed to proceed for an extended period of time even up to one week. Suitable catalysts for the reaction are mineral acids, such as sulfuric acid, hydrochloric acid or phosphoric acid. In addition, metal halides, such as zinc chloride, aluminum chloride, boron trifluoride and tin tetrachloride, and phosphorous halides, such as phosphorous trichloride, may be used. The preferred catalyst is sulfuric acid. If desired, the reaction may be carried out in the presence of solvents.

Suitable solvents are water and/or aliphatic alcohols with 1 to 5 carbon atoms such as methanol, ethanol or propanol. It is also possible to use acetic acid or higher homologs and aromatic or aliphatic hydrocarbons such as benzene, toluene, xylene, hexane or petroleum ether. In the presence of a solvent, one mole of the ketone is condensed with two moles of phenol. In the absence of a solvent, it is useful to initiate the reaction with an excess of the phenol.

The reaction product is obtained by pouring the reaction mixture into water and neutralizing with an alkaline solution, such as sodium carbonate or sodium hydroxide. The aqueous slurry can then be extracted with an organic solvent, for example, ethyl acetate. The ethyl acetate is then removed and the residue crystallized from an organic solvent, for example, benzene.

The product of the invention has excellent laxative (cathartic) properties and is, therefore, useful for treating constipation in mammals. For instance, the laxative effect can be demonstrated by administering the compound to rats in doses of 100 milligrams per kg or less. At the same time, the toxicity is very low. No toxic side effects were observed at the above dosage levels.

For the experiments on rats, the compound was administered by intubation in the form of an aqueous suspension in carboxymethyl cellulose. For practical usage, the compound is administered orally or rectally, the application forms being those normally used in therapy for laxatives, e.g. tablets, hard and soft gelatin capsules, suppositories, oily and aqueous suspensions, and the like. In these preparations, the active substance may be present in concentrations of 5 to 100 milligrams per dosage unit or, in the case of liquids or suspensions, at concentrations of 0.5 to 50 percent. The excipients used are those inert ingredients common to pharmaceutical practice, e.g. talc, glucose, magnesium stearate, agar agar, tragacanth, vegetable and mineral oils, etc.

Example 4,4',4''-Trihydroxytriphenylmethylmethane

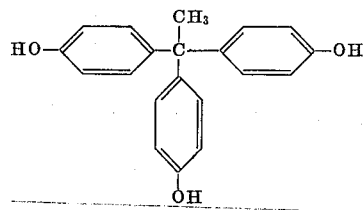

A solution of 43.6 ml concentrated sulfuric acid and 33.4 ml water was added dropwise over 15 minutes to a solution of 54.4 g 4-hydroxyacetaphenone and 85.4 g liquid phenol (88 percent). The reaction mixture was stirred and heated to approximately 50°–60° C for 16 hours and intermittently stirred at room temperature for approximately 6 days. The reaction mixture was poured into 400 ml water and neutralized with a sodium carbonate solution. The aqueous phase was extracted with ethyl acetate, and the ethyl acetate solution was dried over anhydrous calcium sulfate. The dried ethyl acetate solution was vacuum evaporated to an oil, which was dissolved in benzene for crystallization. The crystals obtained melted at 240°–243° C.

We claim:

1. A pharmaceutical composition having laxative properties comprising 5 to 100 milligrams of 4,4',4''-trihydroxytriphenylmethylmethane and a pharmaceutical excipient.

2. A process for treating constipation in mammals which comprises orally or rectally administering thereto an effective amount of the composition defined in claim 1.

* * * * *